United States Patent [19]

Kelly et al.

[11] Patent Number: 4,781,839

[45] Date of Patent: Nov. 1, 1988

[54] METHOD FOR FLOCCULATING AND REMOVING SOLIDS SUSPENDED IN WATER

[75] Inventors: David W. Kelly, Toronto; Stewart N. Paul; John E. Waller, both of Mississauga, all of Canada

[73] Assignee: Dearborn Chemical Company, Limited, Mississauga, Canada

[21] Appl. No.: 106,474

[22] Filed: Oct. 8, 1987

Related U.S. Application Data

[62] Division of Ser. No. 897,905, Aug. 19, 1986, Pat. No. 4,734,216.

[30] Foreign Application Priority Data

Jan. 28, 1986 [CA] Canada ................................ 500477

[51] Int. Cl.$^4$ ................................................. C02F 1/54
[52] U.S. Cl. .................................... 210/725; 210/728; 210/730
[58] Field of Search ............... 210/725, 727, 728, 729, 210/730; 252/181

[56] References Cited

U.S. PATENT DOCUMENTS

| | | | |
|---|---|---|---|
| 2,133,251 | 10/1938 | McCord | 210/729 |
| 3,872,000 | 3/1975 | Hamada et al. | 210/732 |
| 4,110,208 | 8/1978 | Neal | 252/181 |
| 4,263,148 | 4/1981 | Symens et al. | 210/727 |
| 4,450,092 | 5/1984 | Huang | 252/181 |
| 4,558,080 | 12/1985 | Quamme et al. | 210/728 |

FOREIGN PATENT DOCUMENTS

| | | | |
|---|---|---|---|
| 49-4683 | 1/1974 | Japan | 210/727 |
| 52-9968 | 1/1977 | Japan . | |
| 52-9969 | 1/1977 | Japan . | |
| 52-34547 | 3/1977 | Japan . | |
| 52-59953 | 5/1977 | Japan . | |
| 52-61356 | 5/1977 | Japan . | |
| 899721 | 6/1962 | United Kingdom | 210/730 |
| 1188394 | 4/1970 | United Kingdom . | |
| 2152945 | 8/1985 | United Kingdom . | |

OTHER PUBLICATIONS

"Wastewater Treatment Plant Design"; Water Pollution Control Federation/American Society of Civil Engineers; 1977; pp. 159-176, 200.

"Condensed Tannins for Adhesives"; Antonio Pizzi; 1982; Ind. Eng. Chem. Prod. Res. Dev., vol. 21, No. 3; pp. 359-369.

"Betz Handbook of Industrial Water Conditioning"; Eighth Edition 1980; pp. 24-31.

87:58163t, "Treatment of Polyvinyl Alcohol-Containing Wastewater"; Hara; Japan Kokai 77 34,547; Chemical Abstracts, vol. 87, 1977.

87:72984t, "Treatment of Surfactant-Containing Wastewater"; Hara; Japan Kokai 77 09,968; Chemical Abstracts, vol. 87, 1977.

87:72985u, "Treatment for Surfactant-Containing Wastewater"; Hara; Japan Kokai 77 09,969; Chemical Abstracts, vol. 87, 1977.

87:188941f, "Treatment of Wastwater-Containing Surfactant"; Hara; Japan Kokai 77 59,953; Chemical Abstract, vol. 87, 1977.

88:11520n, "Surfactant Removal from Wastewater"; Hara; Japan Kokai 77 61,356; Chemical Abstracts, vol. 88, 1978.

Search Report, British Patent Office; for GB Application No. 8,623,459; Nov. 17, 1986; p. 1.

*Primary Examiner*—Peter Hruskoci
*Attorney, Agent, or Firm*—David E. Heiser

[57] ABSTRACT

Methods are described for flocculating and removing solids suspended in water using an inorganic component containing iron, aluminum, or a mixture thereof in combination with a tannin-based flocculant produced by reacting a condensed tannin with an amino compound and an aldehyde. The tannin-based flocculant is preferably the product of a controlled reaction in which the viscosity is monitored as an indication of suitable shelf life.

20 Claims, No Drawings

METHOD FOR FLOCCULATING AND REMOVING SOLIDS SUSPENDED IN WATER

This is a division of application Ser. No. 897,905, filed Aug. 19, 1986, and issued as U.S. Pat. No. 4,734,216, on Mar. 29, 1988.

FIELD OF THE INVENTION

This invention relates to a composition and a method used for flocculation and coagulation, and particularly to the use of a combination of a tannin-based flocculant with inorganic flocculants containing iron or aluminum to flocculate and remove solids suspended in water.

BACKGROUND OF THE INVENTION

The flocculation of matter suspended in water to enhance clarification rates is an important aspect of industrial and municipal water treatment. Inorganic coagulants such as lime, alum, ferric chloride, ferrous sulfate, ferric sulfate and sodium aluminate have traditionally been used. These chemicals, while aiding in the removal of suspended solids, generally provide additional quantities of dissolved inorganic solids which can themselves provide water problems, particularly where the water is recirculated in substantial quantities.

Polymeric organic coagulants have also proved valuable for flocculation. These polyelectrolytes are often preferred because, in addition to their minimal affect on dissolved solids, they tend to produce less, more compact waste sludge, and they tend not to appreciably affect the pH of the treated water. Cationic polyamines are typical organic coagulants. In addition, high molecular weight polymers such as anionic polyacrylamides have been used to aid in flocculation achieved with primary organic or inorganic coagulants. Anionic polymers are used to aid settling and in conjunction with the aluminum or iron salts, while cationic polymers are preferably used in dewatering settled sludge and, in some cases, to aid in metal salt coagulation.

Tannins occur naturally in various vegetative materials including barks and woods. Established industrial practices of extracting tannins from the wood of the quebracho tree and the bark of the wattle tree have made condensed tannins available in substantial quantities. Condensed tannins are polyphenolic and polymerize in combination with other chemicals such as formaldehyde. A. Pizzi, in "Condensed Tannins for Adhesives" *Ind. Eng. Chem. Prod. Res. Dev.* 1982, 21, 359-369 discusses natural tannins and their particular use in the manufacture of particle board, plywood, and other industrial products which incorporate adhesives.

British Pat. No. 899,721 discloses use of a reaction product of a tannin, a formaldehyde and an amino or ammonium compound in the flocculation of suspensions such as sewage, industrial waste, and natural water. The disclosed advantages of using these flocculants are that they do not affect the pH of the suspension and that they do not affect the dissolved inorganic solids content of the treated water. A disadvantage of these products is that they tend to gel quickly, making them unfit for commerical use at locations remote from their production site.

U.S. Pat. No. 4,558,080 discloses the production of stable tannin-based flocculants by controlling the reaction of tannin with an aldehyde and an amino compound by, among other things, monitoring the viscosity of the reacting mixture. The resultant product has a shelf life which renders it commerically suitable as a flocculant and competitive with other well-known flocculants such as alum. However, as with other commercial flocculants, substantial quantities of the tannin-based flocculant must be used during water treatment. Means for increasing the efficiency of flocculation and clarification while reducing material consumption and other costs continue to be sought.

SUMMARY OF THE INVENTION

A tannin-based flocculant is used in combination with alum, ferric chloride, or a combination of alum and ferric chloride to substantially improve the efficiency of solids flocculation and clarification of water containing suspended solids.

It is an object of this invention to use a modified tannin flocculant in combination with an inorganic flocculant containing iron or aluminum for the clarification of raw water.

It is another object of this invention to utilize an inorganic flocculant to significantly reduce the quantity of tannin-based flocculant required in clarification of raw water.

It is still another object of this invention to use a tannin-based flocculant to significantly reduce the quantity of inorganic flocculant required to clarify raw water.

It is yet another object of this invention to provide a flocculant which may be efficiently used with raw waters containing substantial concentrations of iron, aluminum, or both iron and aluminum to effectively and efficiently clarify such water.

These and further objects will become apparent from the description of the preferred embodiments.

DESCRIPTION OF THE PREFERRED EMBODIMENTS

The reaction between formaldehyde and amino compounds and a compound, such as a phenolic compound, which contains reactive hydrogen atoms is known as the Mannich Reaction. Tannin-containing extracts such as those from quebracho wood or wattle bark are polyphenolic and can be reacted with an aldehyde, particularly formaldehyde, and an amino compound such as monoethanolamine or ammonium salts such as ammonium chloride to form flocculants for water treatment.

Preferably, the tannin-based flocculant utilized in this invention is made in accordance with disclosure of U.S. Pat. No. 4,558,080 which is hereby incorporated in its entirety by reference. Such a flocculant uses condensed polyphenolic tannins and is prepared under slightly acidic conditions where the pH is less than 7 and where the molar ratio of the primary amine from the amino compound to the tannin repeating unit is from about 1.5:1 to about 3.0:1. To form a tannin-based component having a long shelf life, the reaction mixture is heated at a temperature of from about 150° to about 200° Fahrenheit until a reaction product forms which has an intermediate viscosity within a "key intermediate viscosity range" and the reaction is then terminated by external cooling, by adding quench water, and by adding acid. The "key intermediate viscosity range" is determined experimentally for each flocculant reaction system and is generally within a narrow range between about 2 and about 100 cps when measured at 180° Fahrenheit on a Brookfield LVT viscosimeter. The reaction is terminated by external cooling, by adding quench water, and by adding acid. The solids content of the resultant liquid flocculant is preferably about 20% to about 60% by weight and the pH is preferably less than 3.0. Preferably an antifoamer material such as silicon anti-foamer exemplified by Silicone B made by Dow Chemical Co., a mineral seal oil, or a high molecular weight alcohol is added to prevent excessive foaming.

U.S. Pat. No. 4,558,080 describes the production of a tannin-based flocculant using monoethanolamine as the amino compound and formaldehyde as the aldehyde. As described therein, a reactor containing 130.75 grams pg,7 of de-ionized water was preheated to 150° F. Gradually 125.75 grams of Mimosa extract, available as a spray-dried tannin powder sold by Canadian Packers, Ltd., was gradually added while stirring. The temperature was maintained at about 130° to 140° Fahrenheit. After complete dissolution, the material was cooled to 110° Fahrenheit. Then 0.15 grams of a silicon antifoamer, Silicone B made by Dow Chemical, was added.

To the aqueous tannin solution, 47.65 grams of monoethanolamine was added to yield a primary amine to tannin ratio of 1.86:1 while mixing, and the temperature of the reaction mixture was allowed to rise to 130° Fahrenheit and it was maintained at this temperature until all of the amine was added. In order to maintain the acid conditions of the reaction mixture 80 grams of a 32% active hydrochloric acid was added to bring the pH in the range of 6.4 to 6.7 and the temperature was allowed to rise to 140° Fahrenheit. Upon forming its initial tannin/amine solution, the mixture was then cooled to 120° Fahrenheit.

Next, the formaldehyde was added in the form of 62.70 grams of 37% active formaldehyde and the temperature during this addition was maintained between 120° and 130° Fahrenheit. As the formaldehyde was mixed with the previous solution the solution was heated to initiate the reaction and the temperature was controlled so that it was not allowed to go above about 180° Fahrenheit. As the reaction proceeded the viscosity of the solution was monitored using a Brookfield LVT viscosimeter where the samples were measured at temperature of about 178° to 180° Fahrenheit. When the viscosity reading reached 38 to 40 cps, the desired degree of reaction was obtained. At this point, the reaction material was quenched by the addition of external cooling and 45.20 grams of de-ionized water and 7.8 grams of muriatic acid to obtain a final pH of 2.4 and to obtain a solids content of about 40.2% and a final viscosity of 246 cps.

A similar composition produced in accordance with U.S. Pat. No. 4,558,080 was available commercially as the product Klar-Aid 6400 produced by Dearborn Chemical Company, Ltd. This composition contained approximately 40% of a modified cationic tannin formed as the reaction product of Mimosa extract, formaldehyde, and monoethanolamine. This tannin-based flocculant was used in the following non-limiting examples to demonstrate its relative effectiveness alone and in combination with inorganic salts of iron and aluminum.

EXAMPLE 1

River Water Sample 1, obtained from the Credit River near Mississauga, Ontario, was adjusted to a pH of 6.6 using sulfuric acid. 20 milligrams per liter of pioneer clay was added to the water to improve the visibility of the test so that evaluation of flocculant effectiveness was facilitated. This water provided a stable dispersion having a settling time greater than 24 hours. 500 milliliters of this modified river water was added to each of six beakers. Each of the beakers had a paddle stirrer positioned at approximately one-third the depth of the beaker water level. Alum as $Al_2(SO_4)_3.18H_2O$ was added to each beaker in the amount specified in Table I and the water was stirred for 0.5 minutes at 100 rpm. The tannin-based flocculant in the form of a composition containing 40% modified cationic tannin was then added in the amount specified in Table I, and the water was stirred for a further minute at 100 rpm followed by five minutes at 70 rpm and five minutes at 40 rpm. After stirring was complete, the time required for the floc to settle to the bottom of the beaker was measured and is recorded as the settling time in Table I below. The optimum dosage for clarification with each component alone was about 15 milligrams per liter (mg/L).

TABLE I

Dosage Combinations vs Settling Time for Tannin/Alum in River Water No. 1

| BEAKER NO. | DOSAGE (mg/L) TANNIN-BASED FLOCCULANT | ALUM | SETTLING TIME (seconds) | SUPERNATANT ANALYSIS IRON (mg/L as $Fe_2O_3$) | ALUMINUM (mg/L as $Al_2O_3$) |
|---|---|---|---|---|---|
| 1 | 15.0 (100%) | — | 120 | <0.01 | <0.1 |
| 2 | 3.0 (20%) | 12.0 (80%) | 300 | <0.01 | 0.1 |
| 3 | 7.5 (50%) | 7.5 (50%) | 180 | <0.01 | <0.1 |
| 4 | 10.5 (70%) | 4.5 (30%) | 120 | 0.033 | <0.1 |
| 5 | 13.5 (90%) | 1.5 (10%) | 60 | 0.033 | <0.1 |
| 6 | — | 15.0 (100%) | 1000 | 0.055 | 0.22 |

EXAMPLE 2

River Water Sample 2, also obtained from the Credit River, was adjusted to a pH of 6.3 using sulfuric acid. 20 milligrams per liter of pioneer clay was added to the water to improve the visibility of the test so that evaluation of flocculant effectiveness was facilitated. This water provided a stable dispersion having a settling time greater than 24 hours. 500 milliliters of this modified river water was added to each of six beakers. Each of the beakers had a paddle stirrer positioned at approximately one-third the depth of the beaker water level. Iron as Fe $Cl_3.6H_2O$ was added to each beaker in the amount specified in Table II and the water was stirred for 0.5 minutes at 100 rpm. The tannin-based flocculant in the form of a composition containing 40% modified cationic tannin was then added in the amount specified in Table II, and the water was stirred for a further minute at 100 rpm followed by five minutes at 70 rpm and five minutes at 40 rpm. After stirring was complete, the time required for the floc to settle to the bottom of the beaker was measured and is recorded as the settling time in Table II below. The optimum dosage for clarification with each component alone was about 20 mg/L.

further minute at 100 rpm followed by five minutes at 70 rpm and five minutes at 40 rpm. After stirring was complete, the rate at which the flocs subsided was mea-

TABLE II

| | Dosage Combinations vs Settling Time for Tannin/Iron in River Water No. 2 | | | | |
|---|---|---|---|---|---|
| | DOSAGE (mg/L) | | | SUPERNATANT ANALYSIS | |
| BEAKER NO. | TANNIN-BASED FLOCCULANT | FERRIC CHLORIDE | SETTLING TIME (seconds) | IRON (mg/L as $Fe_2O_3$) | ALUMINUM (mg/L as $Al_2O_3$) |
| 1 | 20.0 (100%) | — | 600 | <0.05 | <0.1 |
| 2 | 4.0 (20%) | 16.0 (80%) | 420 | 0.50 | <0.1 |
| 3 | 10.0 (50%) | 10.0 (50%) | 285 | 0.30 | <0.1 |
| 4 | 14.0 (70%) | 6.0 (30%) | 150 | 0.10 | <0.1 |
| 5 | 16.0 (80%) | 4.0 (20%) | 90 | <0.05 | <0.1 |
| 6 | — | 20.0 (100%) | 420 | 0.43 | <0.1 |

EXAMPLE 3

River Water Sample 3, also obtained from the Credit River, was adjusted to a pH of 6.6 using sulfuric acid. 20 milligrams per liter of pioneer clay was added to the water to improve the visibility of the test so that evaluation of flocculant effectiveness was facilitated. This water provided a stable dispersion having a settling time greater than 24 hours. 500 milliliters of this modified river water was added to each of six beakers. Each of the beakers had a paddle stirrer positioned at approximately one-third the depth of the beaker water level. Alum as $Al_2(SO_4)_3.18H_2O$ was added to each beaker in the amount specified in Table III and the water was stirred for 0.5 minutes at 100 rpm. The tannin-based flocculant in the form of a composition containing 40% modified cationic tannin was then added in the amount specified in Table III, and the water was stirred for a further minute at 100 rpm followed by five minutes at 70 rpm and five minutes at 40 rpm. After stirring was complete, the rate at which the flocs subsided was measured as a function of time and is recorded as the settling rate in Table III.

TABLE III

| | Dosage vs. Settling Rate for Tannin Flocculant/Alum in River Water No. 3 | | |
|---|---|---|---|
| | DOSAGE (mg/L) | | SETTLING RATE (cm/minute) |
| BEAKER NO. | TANNIN-BASED FLOCCULANT | ALUM | |
| 1 | 30.0 (100%) | — | 0.071 |
| 2 | 24.0 (80%) | 6.0 (20%) | 2.0 |
| 3 | — | 30.0 (100%) | 0.071 |

EXAMPLE 4

River Water Sample 3, obtained from the Credit River, was adjusted to a pH of 6.6 using sulfuric acid. 20 milligrams per liter of pioneer clay was added to the water to improve the visibility of the test so that evaluation of flocculant effectiveness was facilitated. This water provided a stable dispersion having a settling time greater than 24 hours. 500 milliliters of this modified river water was added to each of six beakers. Each of the beakers had a paddle stirrer positioned at approximately one-third the depth of the beaker water level. Ferric chloride as $FeCl_3.6H_2O$ was added to each beaker in the amount specified in Table IV and the water was stirred for 0.5 minutes at 100 rpm. The tannin-based flocculant in the form of a composition containing 40% modified cationic tannin was then added in the amount specified in Table IV, and the water was stirred for a further minute at 100 rpm followed by five minutes at 70 rpm and five minutes at 40 rpm. After stirring was complete, the rate at which the flocs subsided was measured as a function of time and is recorded as the settling rate in Table IV.

TABLE IV

| | Dosage vs. Settling Rate for Tannin Flocculant/Iron in River Water No. 3 | | |
|---|---|---|---|
| | DOSAGE (mg/L) | | |
| BEAKER NO. | TANNIN-BASED FLOCCULANT | FERRIC CHLORIDE | SETTLING RATE (cm/minute) |
| 1 | 30.0 (100%) | — | 0.071 |
| 2 | 24.0 (80%) | 6.0 (20%) | 1.33 |
| 3 | — | 30.0 (100%) | 0.015 |

From the above results, it will be appreciated that the use of tannin-based flocculants together with either alum or ferric chloride demonstrates an effectiveness which is unanticipated from the performance of either component alone. It will be evident to one skilled in the art that the flocculated solids can be removed from the clarified water by conventional means. It will be particularly evident to one skilled in the art that solids settled in accordance with the above-described examples can be separated from the supernatent by such means as clarifiers or filtration apparatus.

In particular, Example 1 demonstrates both the superior performance of the tannin-based flocculant alone over alum alone on a weight to weight basis, and the ability of small amounts of a tannin-based flocculant to improve the performance of a predominantly alum flocculant. While ferric chloride alone was more effective in Example 2 over tannin-based flocculant alone, equal amounts of both was more effective than either alone. More important to users of a tannin-based flocculant, however, are the consistent results in Examples 1 and 2 that adding from approximately 10 up to approximately 30% of inorganic flocculant to a predominantly tannin-based flocculant provides not only a competitive flocculant but a flocculant with unexpected effectiveness which even exceeds the effectiveness of the tannin-based flocculant alone. This finding is supported by the results in Examples 3 and 4, where the settling rates achieved by compositions including 80% tannin-based flocculant and 20% inorganic flocculant are strikingly superior.

While the preferred tannin-based component has been described above, it is understood that other flocculants may be prepared by aqueous reaction of a tannin with an amino compound and an aldehyde. Mimosa extract is shown above to form a particularly suitable flocculant, but both quebracho extract and wattle extract are preferred from the standpoint of availability and proven suitability as flocculant-forming reactants. Other suitable tannins can be obtained from various wood and vegetation materials found throughout the world. Tannins are, in fact, a large group of water-soluble, complex organic compounds. Almost every tree or shrub that grows contains some tanins in the leaves, twigs, barks, wood, or fruit. Examples of barks are wattle, mangrove, oak, eucalyptus, hemlock, pine, larch, and willow. Examples of woods are the quebracho, chestnut, oak and urunday.

Examples of fruits are myrobalans, valonia, divi-divi, tara, and algarrobilla. Examples of leaves are sumac and gambier and examples of roots are canaigre and palmetto. The tannin extracts of many of these materials, and in particular the condensed polyphenolic tannin extracts, are thought to be sufficiently reactive to provide adequate flocculant qualities.

The preferred aldehyde is formaldehyde which can be used in the form of 37% active formaldehyde solution. This is also commercially available as formalin which is an aqueous solution of 37% formaldehyde which has been stabilized with from 6–15% methanol. Other commercial grades of formaldehyde and its polymers could be used. Such commercial grades include 44, 45, and 50% low-methanol formaldehyde, solutions of formaldehyde in methyl, propyl, n-butyl, and isobutyl alcohol, paraformaldehyde and trioxane. When using solid paraformaldehyde, care must be taken that it all dissolves.

Other aldehyde containing or generating reactants are organic chemical compounds which contain at least one aldehyde group therein, as are well-known and include, for example, formaldehyde, acetaldehyde, propionaldehyde, glycolaldehyde, glyoxylic acid and the like or polyaldehydes, i.e. organic compounds having more than one aldehyde group in the compound, such as glyoxal, paraformaldehyde and the like. Other suitable aldehyde reactants include aldehyde generating agents, i.e. known organic compounds capable of forming an aldehyde group in site, such as melamine-formaldehyde monomeric products and derivatives such as tri and hexa(methylol) melamine and the tri and hexa ($C_1$–$C_3$ alkoxymethyl) melamine. Such materials can be formed by known conventional methods. The alkyl blocked derivatives are commercially available, are stable to self-polymerization and are, therefore, preferred.

Particularly preferred are amino compounds that include monoethanolamine, ammonia and water soluble inorganic ammonium salts such as ammonium chloride. Other preferred materials include primary amines such as monoethanolamine, methylamine and ethylamine. Secondary amines and other amine compounds are also acceptable. The primary amines are preferred since they are the more reactive amines than secondary or tertiary amines.

It will be evident to one skilled in the art that other aluminum and iron salts or mixtures thereof could be used as the organic flocculants of this invention. Examples of these flocculants are ferric sulphate, aluminum chloride, ferrous sulfate, and sodium aluminate. Moreover, it will also be evident to one skilled in the art that tannin-based flocculants should be particularly effective in raw waters already containing substantial amounts of aluminum, iron, or both aluminum and iron. Treatment of these waters may include adding tannin polymer, with or without further addition of inorganic flocculants. Preferably the weight ratio of tannin-based flocculant to the total iron and aluminum salt concentration is at most about 9:1.

The amount of additives required for effective flocculation is dependent upon the treatment objectives as well as on the quality of the water to be treated and the nature of the solids suspended therein. The pH of the system can be important in determining whether there is efficient floc formation. However, the optimum pH for floc formation varies from water to water. Thus pH adjustment may be an effective treatment step.

The tannin-based flocculant and the inorganic flocculant of this invention can be added during treatment either separately, or together, as a compositon containing both components. The components work together to achieve exceptional effectiveness.

The examples describe various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is understood that the invention is not confined to the particular formulations and examples herein illustrated and described, but it embraces such modified forms thereof as come within the scope of the following claims.

What is claimed is:

1. A method of treating water containing suspended solids to remove from the water solids suspended therein comprising the steps of:
   (a) adding to the water a metal salt selected from the group consisting of inorganic flocculants comprising aluminum, iron, or mixtures thereof;
   (b) adding to the water tannin-based flocculant with a modified tannin produced by reacting a condensed tannin with an amino compound and an aldehyde; said additives from steps (a) and (b) being added in effective amounts to work together to flocculate solids suspended in the water and substantially improve solids flocculation efficiency; and
   (c) removing flocculated solids from the water.

2. The method of claim 1 wherein production of the modified tannin includes reacting a tannin extracted from quebracho wood or wattle bark with formaldehyde and an amino compound selected from a group consisting of monoethanolamine, methylamine, and ammonium chloride.

3. The method of claim 1 wherein production of the modified tannin includes reacting Mimosa extract with formaldehyde and monoethanolamine.

4. The method of claim 1 wherein the weight ratio of tannin-based flocculant to metal salt is from about 9:1 to about 2.33:1.

5. The method of claim 1 wherein the solids are settled for removal.

6. The method of claim 1 further including the step of adjusting the pH of the water to optimize floc formation.

7. The method of claim 1 wherein production of the tannin-based flocculant includes (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

8. The metod of claim 7 wherein the tannin-based flocculant contains approximately 40% modified cationic tannin.

9. The method of claim 8 wherein the metal salt comprises alum; and wherein the weight ratio of tannin-based flocculant to alum is approximately 9:1.

10. The method of claim 8 wherein the metal salt comprises ferric chloride; and wherein the tannin-based flocculant weight ratio to ferric chloride is approximately 4:1.

11. The method of claim 1 wherein the modified tannin is a cationic reaction product.

12. The method of claim 11 wherein the first component is a product of a process including the steps of (i) forming an aqueous reaction mixture of the tannin, the amino compound and the aldehyde under slightly acidic conditions where the pH is less than 7 and where the molar ratio of the primary amine from the amino compound to the tannin repeating unit is from about 1.5:1 to 3.0:1; (ii) heating the reaction mixture at a temperature of from about 150° to 200° Fahrenheit until the reaction product forms which has an intermediate viscosity within the range of the system key intermediate viscosity range, said system key intermediate viscosity range being determined through each reactant system as the narrow intermediate viscosity range which permits the resulting product to have a long shelf life, said system key intermediate viscosity range being within the range of from about 2 to 100 cps when measured at a 180° Fahrenheit on a Brookfield LVT viscosimeter; and (iii) terminating the reaction when the intermediate viscosity has reached the conditions specified in step (ii) and adjusting the solids content of the liquid to about 20 to 60 percent by weight and adjusting the pH to a value of less than 3.0.

13. The method of claim 12 wherein the weight ratio of tannin-based flooculant to metal salt is from about 9:1 to about 2.33:1.

14. The method of claim 13 further comprising the step of adjusting the pH to optimize floc formation.

15. The method of claim 13 wherein production of the modified tannin includes reacting a tannin extracted from quebracho wood or wattle bark with a formaldehyde and an amino compound selected from a group consisting of monoethanolamine, methylamine, and ammonium chloride.

16. A method of treating water containing suspended solids and having a substantial concentration of aluminum, iron or mixtures thereof to remove from the water solids suspended therein, comprising the steps of:
(a) adding to the water an effective amount of tannin-based flocculant produced by reacting a condensed tannin with an amino compound and an aldehyde to work together with aluminum, iron, or mixtures thereof in the water to flocculate solids suspended in the water, said flocculant and said concentration being present in said water in amounts effective in substantially improving solids flocculation efficiency; and
(b) removing flocculated solids from the water.

17. The method of claim 16 wherein production of the tannin-based flocculant includes reacting a tannin extracted form quebracho wood or wattle bark with formaldehyde and an amino compound selected from a group consisting of monoethanolamine, methylamine, and ammonium chloride.

18. The method of claim 16 further comprising the step of raising the total water concentration of iron and aluminum by adding a metal salt selected from the group consisting of inorganic flocculants comprising iron, aluminum, or mixtures thereof such that the weight ratio of tannin-based flocculant to the total iron and aluminum salt concentration is, at most, about 9:1.

19. The method of claim 16 further comprising the step of adjusting the pH of the water to optimize floc formation.

20. The method of claim 16 wherein the modified tannin is a cationic reaction product.

* * * * *